United States Patent [19]

Chou et al.

[11] 4,097,908
[45] Jun. 27, 1978

[54] METHOD FOR INSPECTING THE SKEW OF A MAGNETIC HEAD, FOR SELECTIVELY LOCATING A LEAD SCREW AND AN APPARATUS THEREFOR

[75] Inventors: Albert S. Chou, Monte Sereno; Frank M. Balbas, San Jose, both of Calif.

[73] Assignee: Shugart Associates, Sunnyvale, Calif.

[21] Appl. No.: 724,701

[22] Filed: Sep. 17, 1976

[51] Int. Cl.² ........................ G11B 5/56; G11B 5/43; G11B 5/012
[52] U.S. Cl. .................................... 360/76; 360/109; 360/97
[58] Field of Search .................... 360/76, 75, 109, 106, 360/135, 133

[56] References Cited

U.S. PATENT DOCUMENTS

| 2,938,962 | 5/1960 | Konins et al. | 360/76 |
| 2,939,921 | 6/1960 | Martin | 360/76 |
| 3,185,972 | 5/1965 | Sippel | 360/109 |
| 3,414,816 | 12/1968 | Tobey et al. | 360/76 |
| 3,679,841 | 7/1972 | Herger et al. | 360/109 |
| 4,005,493 | 1/1977 | Morgan | 360/97 |

FOREIGN PATENT DOCUMENTS

| 1,398,690 | 6/1975 | United Kingdom | 360/76 |

*Primary Examiner*—Alfred H. Eddleman

*Attorney, Agent, or Firm*—Boone, Schatzel, Hamrick & Knudsen

[57] ABSTRACT

A method of inspecting the skew angle of the transducing gap of a magnetic head in a disk drive having a rotatable spindle, a lead screw rotatably mounted to a motor and carrying a carriage with a magnetic head affixed thereto, the magnetic head having a transducing gap that is disposed in a transducing relationship relative to bits of information on a disk and that is skewed at an angle relative to a radial line of the disk, the magnetic head serving to produce a read signal having an amplitude corresponding to the skew angle and to the acute angle of the bits. The method comprising providing a disk on the spindle, the disk including a track having bits of information recorded at a plurality of predetermined acute angles relative to a radial line of the disk, the acute angles lying in a range between a first angle in the counterclockwise direction and a second angle in the clockwise direction, rotating the disk, and monitoring the amplitude of the read signal, whereby when the amplitude corresponds to a preselected skew angle lying between the first and second angles, whereby a magnetic head having a skew angle greater than the preselected skew angle is capable of being rejected. In the apparatus, the motor is mounted to a plate which in turn is selectively positionable on a housing. By selectively moving the plate, the lead screw can be relocated such that the transducing gap is parallel to the radial line.

16 Claims, 7 Drawing Figures

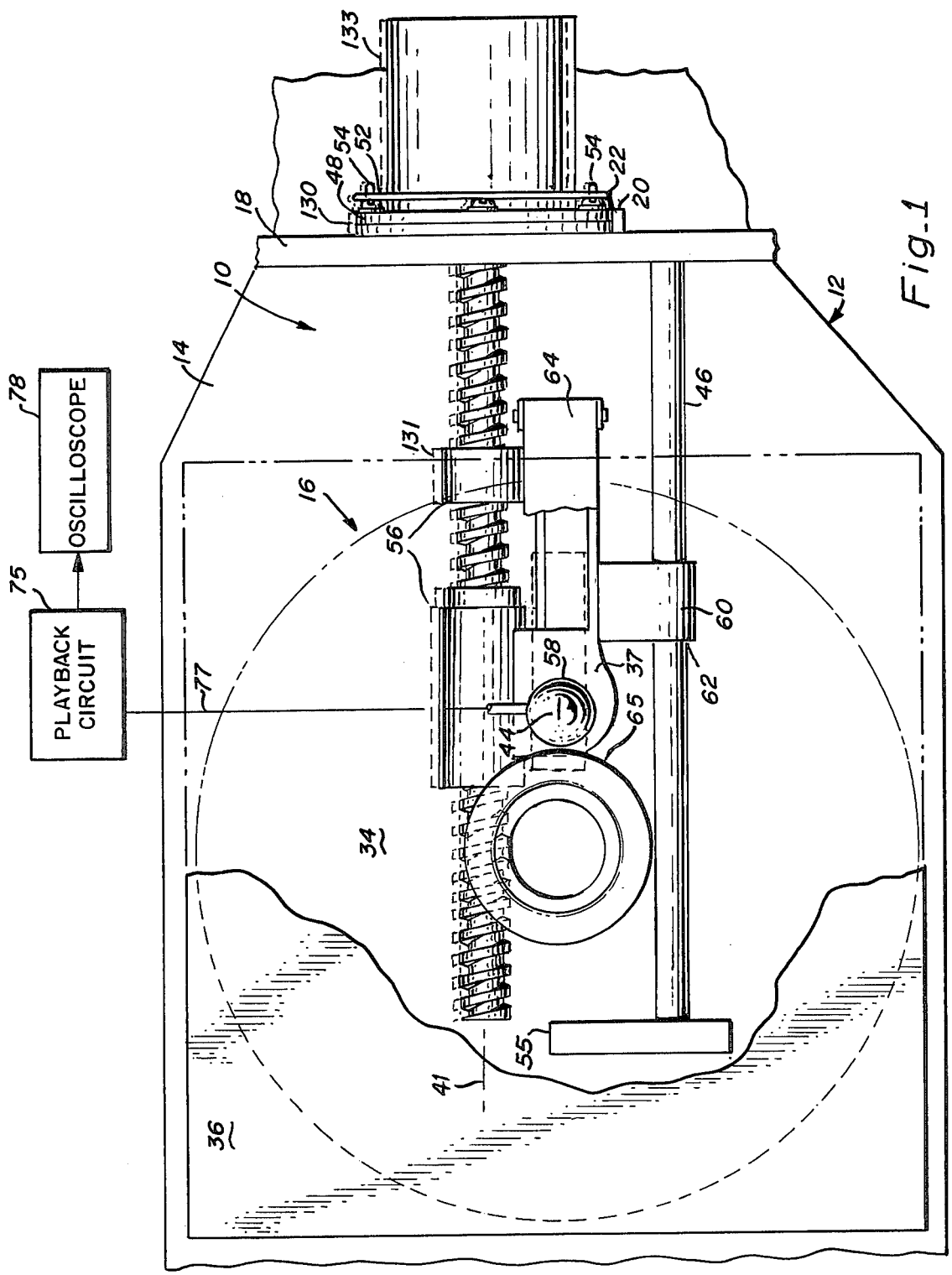
Fig_1

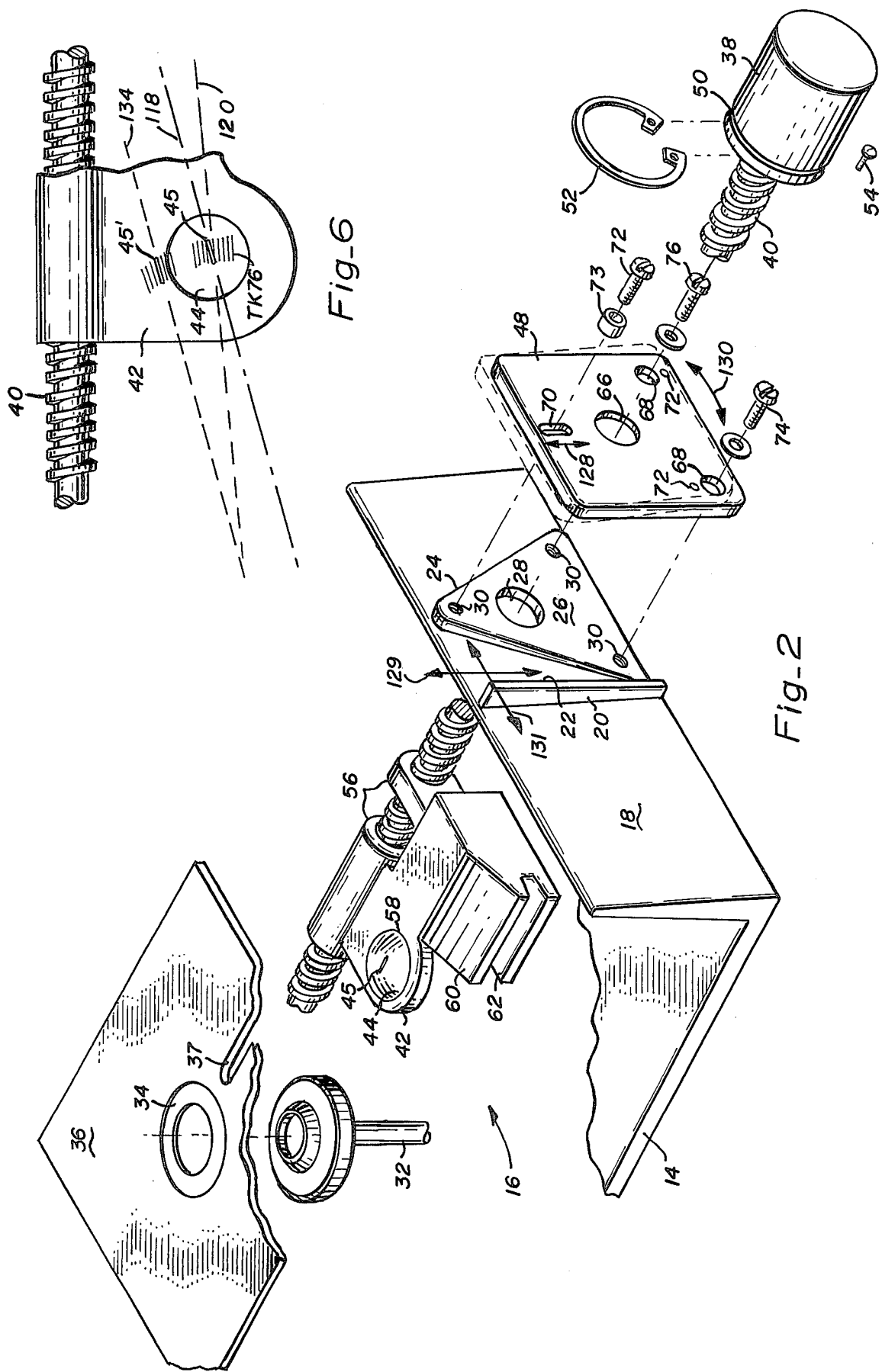

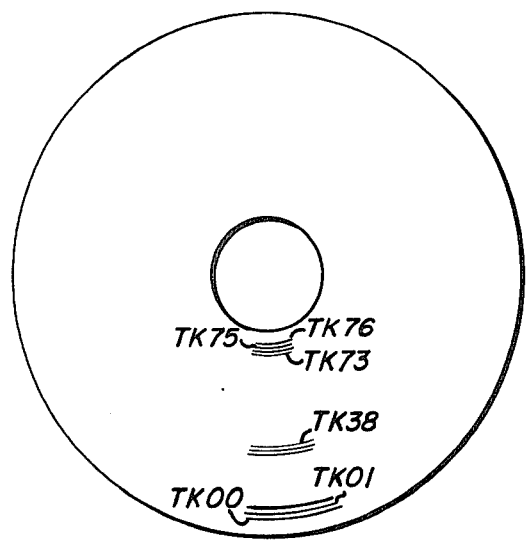
Fig_3
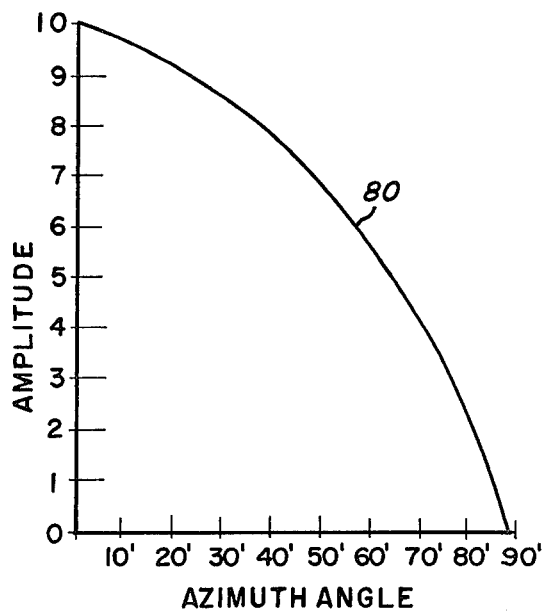
Fig_4
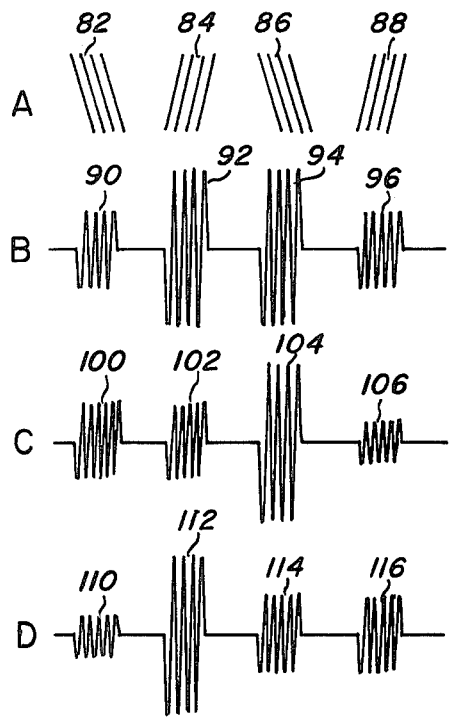
Fig_5
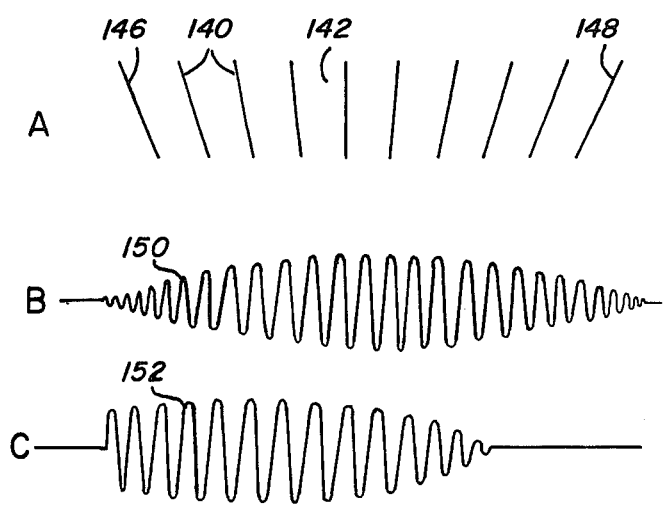
Fig_7

METHOD FOR INSPECTING THE SKEW OF A MAGNETIC HEAD, FOR SELECTIVELY LOCATING A LEAD SCREW AND AN APPARATUS THEREFOR

BACKGROUND OF THE INVENTION

1. Field of the Invention

The present invention relates generally to magnetic recording/playback devices and more particularly, to a method of inspecting the skew of the gap of a magnetic read/write head relative to recorded bits of data on a track of a flexible magnetic record disk, and of relocating a lead screw in a magnetic read/write head-positioning apparatus to minimize such skew and to an apparatus employing a mechanism for accomplishing such relocation.

2. Description of the Prior Art

In magnetic recording/playback apparatus used with flexible or floppy disk recording mediums, a positioning mechanism is employed to move a magnetic head radially across concentric recording tracks on the disk surface while maintaining the head in contact with the disk surface. Typically, the head-positioning mechanism includes a stepping motor mounted to a housing for rotatably driving a lead screw and a carriage mounted to the lead screw and movable thereby along a guide rod. The carriage includes a read/write head and a load arm for maintaining the disk in compliance with the transducing gap of the magnetic head. With the disk disposed on a rotating spindle, energization of the stepping motor rotates the lead screw to drive the carriage across the disk in such a manner as to enable the magnetic head to radially access a selected one of the tracks on the disk surface.

Due to the interchangeability requirements of the floppy disks and the magnetic recording/playback apparatus a skew angle is inherently created between the transducing gap of the head and the recorded bits of information on the tracks of the disk. More particularly, a slight misalignment in the location of the magnetic head when it is affixed to the carriage, a mislocation of the lead screw or the use of a lead screw which is not straight can result in a skewed configuration of the transducing gap of the magnetic head relative to the recorded bits on the disk. Mislocation of the lead screw is a condition that exists when the transducing gap of the head does not lie on a radial line through the center of the disk. This, of course, causes the amplitude of the output signal developed by the magnetic head during the reproducing operation to be decreased with respect to that which was recorded. In instances where the transducing gap is skewed at an angle corresponding to the displacement of one bit over its core width the output signal is lost entirely.

It should be recognized that on magnetic disk recording mediums, the skew problem is most acute at the innermost track since that track has the smallest circumference and hence has the maximum bit density recorded thereon. With floppy disk mediums the inside track has about a two inch radius. An offset in the positioning of a magnetic head of about 0.013 inches in a direction normal to a radial line through the center of the disk has been found to produce an equivalent angular error of about 22 minutes. In some disk drives such an angular error is sufficient to cause the output signal to be lost entirely. This causes the disk drive to provide data that is incorrect.

Presently, an optical alignment technique is used to align the gap of the head before the head is cemented or glued into position in the carriage. In this technique the pole tip region of the head is viewed under a microscope which is focused so that the transducing gap is in view. Then the gap is aligned and the head cemented in place. This technique enables the gap to be aligned within nine minutes of a reference angle. Once the magnetic head is bonded to the carriage and the carriage is mounted on the lead screw, the azimuth angle cannot be aligned relative to an absolute reference.

Other possible techniques for minimizing the azimuth angle of the head involve decreasing the tolerances in the dimensions of the stepper motor, plate, etc., which are costly and not practical in many instances.

Heretofore, floppy disk drives have utilized an FM recording scheme in which a data bit is always associated with a clock bit. This recording scheme allows the information to be recorded at a frequency which is not too great as to be detrimentally effected by the azimuth angles of the transducing gap. Recently, a floppy disk drive has been developed which uses a double density recording scheme. Since the frequency at which the information is recorded is double what it is in the FM recording scheme the problem associated with skew has become more acute.

SUMMARY OF THE PRESENT INVENTION

An object of the present invention is to provide a method of inspecting and aligning the skew angle of the gap of a magnetic head.

Another object of the present invention is to provide a method of locating the lead screw on a magnetic recording disk drive in such a manner that the transducing gap of the head lies on a radial line of the disk and is not skewed with respect to the bits on the disk.

Still another object of the present invention is to provide a magnetic recording/playback head-positioning apparatus having means for adjusting the azimuth angle between the transducing gap of the magnetic head and the recording medium on disk drive devices.

Yet another object of the present invention is to provide a magnetic head-positioning apparatus including a lead screw that can be accurately positioned to minimize skew problems to compensate for misalignment of the head in the carriage and to compensate for inaccuracies in the tolerances of its components.

Briefly, in a preferred embodiment of the present invention, a method of inspecting the skew angle of the head includes the steps of providing a spindle and a disk rotatably carried by the spindle, the disk including an inner track having bits of information recorded at predetermined acute angles relative to the radius of the disk, providing a guide member, such as a lead screw rotatably mounted to a motor and, carrying a carriage with a magnetic head affixed thereto, the magnetic head having a transducing gap that is skewed at an angle relative to a radius of the disk, and producing a read signal having an amplitude that is below a maximum level by an amount corresponding to the skew angle, monitoring the amplitude of the read signal, and comparing the read signal with a predetermined waveform that corresponds to a skew angle wherein the gap is substantially parallel to the radius of the disk.

In still another embodiment, a method of positioning a lead screw includes the steps of providing a spindle and a disk rotatably carried by the spindle, the disk including an inner track having bits of information recorded at predetermined acute angles relative to the radius of the disk, providing a lead screw rotatably mounted to a motor and carrying a carriage with a magnetic head affixed thereto, the magnetic head having a transducing gap that is skewed at an angle relative to a radius of the disk, and producing a read signal having an amplitude that is below a maximum level by an amount corresponding to the skew angle, monitoring the amplitude of the read signal, and moving the lead screw to a location such that the read signal has a predetermined waveform that corresponds to a skew angle wherein the gap is substantially parallel to the radius of the disk.

In yet another embodiment, the present invention includes a stepping motor for mounting to the device housing, a lead screw affixed to the motor shaft, a carriage mounted on the lead screw and carrying a magnetic head with its transducing gap generally aligned with a radius of an associated magnetic disk, and a mechanism for mounting the stepping motor to the housing such that the lead screw is capable of being moved so that the transducing gap is closer to the disk and is parallel to a radius of the disk.

An advantage of the present invention is that it provides a method of inspecting the skew angle of the transducing gap of the magnetic head when the head is located in the carriage.

Another advantage of the present invention is that it provides a magnetic head-positioning apparatus in which the position of the transducing gap of the magnetic head is capable of being adjusted for maximum reproduction amplitude.

Another advantage of the present invention is that it provides a technique for locating the lead screw to minimize skew problems and to compensate for head/carriage misalignment.

Yet another advantage of the present invention is that it provides a simple technique for relocating the lead screw of an assembled magnetic recording/playback head-positioning apparatus to enhance reproduction characteristics of the apparatus.

Other objects and advantages of the present invention will be apparent to those skilled in the art after having read the following detailed description of the preferred embodiments which are illustrated in the several figures of the drawing.

IN THE DRAWING

FIG. 1 illustrates a portion of a magnetic recording/playback device employing a magnetic head-positioning apparatus in accordance with the present invention;

FIG. 2 is an exploded view of the magnetic head-positioning apparatus shown in FIG. 1;

FIG. 3 is a plan view of a floppy disk used in aligning the apparatus shown in FIG. 1;

FIG. 4 is a diagram illustrating read signal amplitude versus azimuth angle for a magnetic head;

FIG. 5 is a diagram illustrating read signal amplitude versus time for magnetic heads skewed at several angles relative to skewed reference signals on an alignment track;

FIG. 6 is a diagram schematically illustrating the location of the lead screw in its initial and in its aligned position; and FIG. 7 is a diagram illustrating read signal amplitude versus time for several positions of a magnetic head in accordance with an alternative embodiment of the present invention.

DETAILED DESCRIPTION OF THE PREFERRED EMBODIMENT

In FIG. 1 of the drawing, the magnetic head-positioning apparatus 10, in accordance with the preferred embodiment of the present invention, is shown mounted to a partially illustrated disk drive device 12.

Referring also to FIG. 2, the device 12 includes a main frame or baseplate 14 having a recessed portion 16 and a wall 18 which extends normal to the face of the frame 14 and is tapered in cross-section. Protruding outwardly from the outside surface of the wall 18 is an elongated portion 20 having a machined surface 22 that serves as a reference surface for generally aligning a stepper motor in a manner which will be subsequently described in detail. Intermediate the portion 20 and an edge is a raised portion 24 having a generally wedge-like shape in a direction corresponding to the taper of the wall 18 and a generally triangular shape in plan view so as to provide a planar reference surface 26 that is substantially normal to the face of the frame. The reference surface 26 is machined to a smooth finish. A central hole 28 and three threaded holes 30 are formed through the raised portion 24 and the wall 18. A drive spindle 32 is disposed within the recessed portion 16 and serves to driveably engage a flexible disk 34 enclosed in an envelope 36 as shown by the dashed lines in FIG. 1. The envelope 36 is provided with an elongated read/write aperture 37 (shown in dashed lines in FIG. 1) through which data may be recorded onto and read from the disk 34.

The magnetic head-positioning apparatus 10 includes an electric stepper motor 38, a lead screw 40 mounted to the drive shaft of the motor 38 and having an axis 41, a carriage 42 mounted to the lead screw 40, a magnetic head 44 affixed to the carriage 42 and having a transducing gap 45, a carriage guide bar 46 and a motor mounting plate 48.

The stepper motor 38 includes a circumferential groove 50 and is affixed to the plate 48 by a C-shaped clamp 52 which fits in the groove 50 and by the bolts 54. The motor 38 serves to rotate the lead screw 40, which extends through the hole 28, clockwise or counterclockwise in 15° increments under the external control of the disk drive system.

The carriage 42 includes two coaxial tubular portions 56 at least one of which is threaded to mate with the lead screw 40, an aperture 58 for receiving the magnetic head 44, and a foot portion 60. The foot portion 60 includes a notch 62 for slideably engaging the guide bar 46. A load arm 64, partially shown in FIG. 1, is spring loaded and pivotally mounted to the carriage 42 and includes a pressure pad (not shown) for pressing the disk 34 against the magnetic head 44. Responsive to an appropriate seek signal, the stepper motor 38 incrementally rotates the lead screw 40. Rotation of the lead screw 40 correspondingly steps the carriage 42, and hence the magnetic head 44, radially relative to the disk 34 from one track 65 to an adjacent track. In the preferred embodiment the pitch of the threads on lead screw 40 is selected such that rotation through a 15° increment causes the carriage 42, and thus the magnetic head 44, to move radially a distance corresponding to one track position. The guide bar or rod 46 is mounted to the wall 18 and to a support 55 and is positioned to mate with the notch 62. The rod 46 serves as a guide for the carriage 42 to prevent it from rotating about the lead screw.

The mounting plate 48 has a generally rectangular shape with a central lead screw-receiving aperture 66, two opposed holes 68, a slot 70 and a pair of tapped holes 72 which serve to receive the bolts 54. The holes 68 and the slot 70 are located to mate with the holes 30. In addition, the holes 68 are oversized relative to the corresponding holes 30 to enable the plate 48 to be adjustably movable relative to the surface 22 and to the surface 26. In accordance with the present invention and in a manner as will be subsequently described in detail, bolts 72, 74 and 76 are disposed through the oversized holes 68 and the slot 70 of the plate 48 and into the tapped holes 30. The bolts serve to mount the motor 38 to the main frame 14 with the lead screw 40 extending through the central aperture 66 such that the location of the lead screw is capable of being precisely adjusted. This occurs when the transducing gap 45 of the magnetic head 44 is in parallel alignment with the bits of information recorded on the innermost track 65 of the disk 34.

A playback circuit 75 disposed on a printed circuit board (not shown) mounted to the device 12 is connected by electrical conductors 77 to the magnetic head 44 and serves to develop a read signal corresponding to the information recorded on the disk 34. An oscilloscope 78 or the like is connected to the output of the playback circuit 75 and serves to provide a visual indication of the read signal.

As indicated above, a skew angle is virtually always present between the transducing gap 45 of the head 44 and the recorded bits of information on the tracks of the disk 34. The skew angle is caused, for example, from misaligning the location of the magnetic head when it is affixed to the carriage, or mislocating the lead screw relative to a direction parallel to a radius of the spindle. In any case, skewing causes the amplitude of the read signal developed by the magnetic head during the reproducing operation to be decreased with respect to the amplitude of the recorded signal. As will be subsequently described, if the transducing gap is skewed at an angle of as little as 88 minutes, which corresponds to a distance equal to the displacement of one recorded bit divided by the track width of the signal, then the read signal is lost entirely.

In order to demonstrate the operational improvement achieved by the present invention as compared to a prior art head-positioning mechanism, reference is made to FIGS. 3–6 of the drawing. FIG. 3 is a plan view of an alignment disk 34 which is used in aligning the lead screw in accordance with the present invention. FIG. 4 is a diagram illustrating the read signal amplitude versus azimuth, or skew, angle of the gap of the magnetic head. In FIG. 5 the read signal amplitude versus time diagram for magnetic heads skewed at several angles relative to a particular skewed reference pattern on the azimuth alignment track (TR76 in FIG. 3) are illustrated. FIG. 6 schematically illustrates the relocation of the lead screw from its initial position to an aligned position.

Referring back to FIG. 3, the alignment disk 34 includes 77 tracks, designated as TK0 through TK76. Several of the tracks include specific patterns which are prerecorded on the disk at the factory. Track 0 (TK00) is the outermost track and includes a pattern corresponding to the coventional IBM format. Track 1 (TK01) is designated as the index track and includes an index pulse which is used to align the angular position of the indexing transducer (not shown) relative to the magnetic head. Track 38 (TK38) is the head radial alignment track and lies between two concentric tracks having patterns written thereon which serve to provide a reference for adjusting the radial position of the magnetic head. The adjustment is made by loosening the bolts 54 and rotating the stepping motor with the machine power on, which effectively moves the head a radial distance until the proper radial position is reached. With the head in such position the bolts 54 are tightened, which causes the clamp 52 to lock the motor 38 to the plate 48. Track 73 (TK73) includes an index pulse that is used in conjunction with the pattern on Track 1 to check the straightness of the lead screw. Track 75 (TK75) has a double frequency signal recorded thereon and provides a pattern that is used for checking the amplitude characteristics of the magnetic head. Track 76 (TK76), the inner track, includes the pattern illustrated in FIG. 5A and serves as the azimuth alignment track.

For this demonstration, it should be recognized that when a magnetic head reads a track prerecorded with a continuous stream of logic "ones", the amplitude of the read signal developed by the magnetic head decreases with increasing azimuth angle as shown by the curve 80 in FIG. 4. As previously described, during the reproducing operation when the gap of the magnetic head is skewed relative to a recorded bit, the amplitude of the read signal is decreased by an amount shown by the curve 80 due to the cancelling effect of the opposed polarities of the adjacent bits.

The read signal $e_\theta$ decreases as the skew angle $\theta$ increases. The relationship indicating the ratio of the amplitude of the read signal when a skew angle occurs and that when there is no skew angle can be written as $$\frac{e_\theta}{e} = \frac{\sin\left(\frac{\pi w \theta}{\lambda}\right)}{\frac{\pi w \theta}{\lambda}}$$

where $e_\theta$ is the voltage of the read signal for a skew angle $\theta$, $e$ is the voltage of the read signal when $\theta$ equals 0°, $\theta$ is the skew angle, $w$ is the track width associated with the transducing gap of the magnetic head, and $\lambda$ is the distance between alternative transitions.

In the preferred embodiment the track width of the magnetic transducer is 12 mils, and the innermost track has a density of 6537 magnetic transitions per inch (BPI) which corresponds to a spacing between adjacent transitions of 0.000306 inches. In this embodiment it has been found that the read signal is zero when the skew angle is about 88 minutes.

For the preferred embodiments, as illustrated in FIG. 4, the curve 80 is relatively flat for azimuth angles between zero and 10 minutes and relatively steep for angles between 60 and 90 minutes. Hence, small changes in amplitude are more capable of being recognized when the azimuth angle is between 10 and 60 minutes.

Referring to FIG. 5, the waveforms of the read signals developed by magnetic heads under several skew conditions are illustrated. FIG. 5A represents the alignment pattern recorded on the alignment track 76 of the disk 34. As shown, the pattern comprises a first burst 82 of bits written at an angle of 48 minutes in the counterclockwise direction, a second burst 84 of bits written at an angle of 24 minutes in the clockwise direction, a third burst 86 of bits written at an angle of 24 minutes in the counterclockwise direction and a fourth burst 88 of bits written at an angle of 48 minutes in the clockwise direction. The bursts are precisely recorded at the factory on track 76. As will be subsequently described the 24 minute and 48 minute angles are chosen to provide the placement of the transducing gap within ± 12 minutes of skew angle. FIG. 5B represents the waveform of the read signal developed by the magnetic head 44 when there is no skew angle between its gap and a bit recorded at zero degrees. As shown, the first portion 90 of the read signal has a relatively low amplitude since the skew angle between the transducing gap and the bits 82 is 48 minutes, the second portion 92 and the third portion 94, which are developed from the bits 84 and 86, respectively, have larger and equal amplitudes since the gap is skewed at angles of 24 minutes relative to the recorded bits, and the portion 96 developed from the bits 88 has the same amplitude as the portion 90 since the skew angle is 48 minutes. FIG. 5C represents the waveform of the read signal developed when the transducing gap is skewed at a 12 minute angle in the counterclockwise direction. As shown, portions 100 and 102 have equal amplitudes since the relative skew angle is 36 minutes relative to the bits 82 and 84, respectively, the portion 104 has a high amplitude since its skew angle relative to the bits 86 is 12 minutes, and the portion 106 which is skewed at an angle of 60 minutes, has a much lower amplitude than the portions 100 and 102. FIG. 5D represents the waveform of the read signal developed when the gap is skewed at an angle of 12 minutes in the clockwise direction. As shown the portion 110 is low, the portion 112 is high and the portions 114 and 116 have equal amplitudes intermediate the levels of the portions 110 and 112.

From the waveforms illustrated in FIG. 5, it has been found that when the skew angle between the transducing gap and the recorded bits is equal to or less than 12 minutes, the second portion of the read signal must be equal to or greater than the first portion, or the third portion of the read signal must be greater than or equal to the fourth portion. In addition, the second and the third portions of the read signal must be equal to or larger than the first and the fourth portions. When the skew angles are greater than 12 minutes the preceding relationships are not satisfied by the read signal.

For purposes of the present invention it has been found that when the skew angle is 12 minutes or less, the read signal amplitude is sufficient to prevent incorrect data from being reproduced. Accordingly, the waveforms shown in FIGS. 5B, 5C and 5D are considered to be reference signals. By comparing the amplitude of the actual read signal developed by the magnetic head with the reference signals, the skew angle of the transducing gap is able to be inspected. More particularly, when the read signal is within the relationship previously described, the skew angle is determined to be acceptable.

Furthermore, it should be recognized that by moving the lead screw, the location of the transducing gap can be varied relative to the bits recorded on the alignment track 76. By comparing the amplitude of the actual read signal developed by the magnetic head as the lead screw is moved to the reference signals and the previously described relationships it has been found that the location of the lead screw can be adjusted to satisfy the skew requirements.

The operation of adjusting the location of the lead screw will now be described. During this operation the read signal developed by the magnetic head 44 is monitored on oscilloscope 78. In the adjusting operation, it is assumed that the magnetic head 44 is bonded in the aperture 58 with its transducing gap 45 skewed, but in general alignment with the bits recorded on the alignment track 76. Because of the skew, the gap will actually move along the line designated by the numeral 118 in FIG. 6 as the lead screw rotates and causes the head to access the tracks of the disk. Ideally, if the gap was not skewed relative to the recorded tracks 65, the gap would travel along a radius of the disk and the spindle indicated by the numeral 120 in FIG. 6. With the plate 48 positioned against the reference surface 22 and assuming that the read signal monitored on the oscilloscope 78 does not comply with the required reference signals, the bolts 72-76 are loosened. The plate 48 is then able to be moved upwardly (or downwardly) along the slot 70 in the direction indicated by the arrows 128. Such movement serves to move the lead screw in the direction shown by the arrows 129 and to adjust the penetration of the head, e.g., the distance between the transducing gap and the media. It should be recognized that the read signal amplitude increases as the distance between the head and the media decreases. Accordingly, the plate 48 is moved along the direction 128 until the read signal is maximized and proper penetration is achieved. Then the bolt 72 is tightened against its bushing 73 which secures the plate 48 to the reference surface 26. Since the bolts 74 and 76 are loosely inserted through the holes 68, the plate 48 is capable of being rotated upon an axis through the bolt 72 in the angular direction indicated by the arrows 130. Because the motor 38 is secured to the plate 48, such rotation causes the motor to move as illustrated by the dashed lines 133 and the lead screw 40 to be displaced along lines that are parallel to the line 118. The plate 48 is thus rotated in the direction illustrated by the arrows 131 until the lead screw 40 is located such that the transducing gap 45 lies on the radial line indicated by the numeral 134 in FIG. 6. In this location the gap 45' is disposed parallel to the bits, perpendicular to the edges of the innermost alignment track and against the disk surface. Thereafter the bolts 74 and 76 are tightened which fixes the lead screw in the aligned location.

Although the preferred embodiment has been described with reference to permissible skew angles of up to ± 12 minutes, it should be understood that if, for example, skew angles of up to ± 15 minutes are permitted, then the same lead screw adjustment procedure can be followed by recording the bit pattern illustrated in FIG. 5A at skew angles of 30 minutes and 60 minutes.

Referring now to FIG. 7, another embodiment of the present invention is illustrated. The fundamental difference between the embodiment of FIG. 5 and the embodiment of FIG. 7 is that the reference bits 140 (illustrated in FIG. 7A) recorded on the innermost track 142 are skewed at continuously varying angles between 48 minutes in the counterclockwise direction (see bit 146) and 48 minutes in the clockwise direction (see bit 148). In this embodiment the read signal 150 (see FIG. 7B) developed by a magnetic head having a gap that is not skewed relative to the recorded bits is enclosed by an envelope which is continuously varying in amplitude. The envelope varies between minimum amplitudes that correspond to the bits 146 and 148 and a maximum amplitude that corresponds to the bit recorded at a skew angle of 0°. Similarly when the transducing gap is skewed at an angle of 24 minutes (see FIG. 7C), the maximum amplitude 152 of the read signal occurs at a time corresponding to the time that the gap reads the bit recorded at a skew angle of 24 minutes in the counterclockwise direction and a minimum read amplitude occurs a time corresponding that when the bit is recorded at a skew angle of 24 minutes in the clockwise direction. In a similar manner to that previously described for the preferred embodiment, the azimuth angle of the transducing gap is inspected. Furthermore, the lead screw is relocated to achieve maximum penetration of the transducing gap 45 against the disk surface by moving the plate 48 in the direction 128. Then the bolt 72 is tightened. Next, the plate 48 and hence the lead screw 40 is rotated in the direction 130 about the bolt 72 until the read signal obtained on the oscilloscope indicates that a skew angle of less than 12 minutes is achieved. Then the bolts 74 and 76 are tightened to fix the lead screw in such location.

The terms "up" and "down" and words of similar import as used herein are intended to apply only to the position of the parts as illustrated in the drawing, since it is well known that the disks and hence the magnetic head-positioning apparatus of the general type illustrated may be mounted or oriented in many different positions in the disk drive.

From the above it should be recognized that a method of inspecting the skew angle of a magnetic head, a positioning apparatus employing an adjustable plate for selectively locating a lead screw such that the transducing gap of the magnetic head is not skewed at the inner track of a flexible disk, and a method of locating a guide member such as the lead screw have been described which fulfill all of the objects and advantages set forth above.

While the invention has been particularly shown and described with reference to certain preferred embodiments, it will be understood by those skilled in the art that various alterations and modifications in form and detail may be made therein. Accordingly, it is intended that the following claims cover all such alterations and modifications as fall within the true spirit and scope of the invention.

What is claimed is:

1. A method of inspecting the skew angle of the transducing gap of a magnetic head in a disk drive having a rotatable spindle and means carrying the magnetic head along a radial of the spindle, comprising:
providing a rotatable disk having several concentric circular recording tracks including one particular track having elongated bits of information magnetically recorded at a plurality of predetermined acute angles measured relative to intersecting radial lines of said disk, said acute angles being in a range between a first angle in the counterclockwise direction relative to a radial line and a second angle in the clockwise direction relative to a radial line;
mounting said disk upon the rotatable spindle;
disposing the magnetic head in a read position relative to the bits of said one track as said disk is rotated;
rotating said disk such that for every bit passing said magnetic head produces a read signal having an amplitude proportional to the difference in angular orientation between said gap and the bit; and
monitoring the amplitudes of said read signals, and comparing such amplitudes to a predetermined reference to determine whether or not the skew angle of the gap is acceptable.

2. A method of inspecting the skew angle of the transducing gap of a magnetic head as recited in claim 1 wherein said first and second angles are equal.

3. A method of inspecting the skew angle of the transducing gap of a magnetic head as recited in claim 1 wherein said first and second angles have magnitudes of less than one degree.

4. A method of inspecting the skew angle of the transducing gap of a magnetic head as recited in claim 1 wherein said track is the inner track on said disk.

5. A method of inspecting the skew angle of the transducing gap of a magnetic head as recited in claim 1 wherein bits disposed at said first angle lie within a first portion of said track and bits disposed at said second angle lie within a second portion of said track and wherein bits disposed in third and fourth portions of said track disposed between said first and second portions, respectively, have clockwise and counterclockwise angles of lesser magnitude than said first and second angles.

6. A method of aligning the magnetic head of a disk drive device including a rotatable disk carrying spindle, a carriage for the magnetic head, a guide member for transporting the carriage along a longitudinal axis thereof, said magnetic head having a transducing gap that is capable of being disposed in a transducing relationship relative to bits of information on a disk and that is skewed at an angle relative to a radial line of said disk, said method comprising:
providing a disk including a track having bits of information recorded at a plurality of predetermined acute angles relative to radial lines of said disk, said acute angles being in a range between a first angle in the counterclockwise direction and a second angle in the clockwise direction;
mounting said disk upon the rotatable spindle;
disposing the magnetic head in a read position relative to the bits of said track as said disk is rotated;
rotating said disk such that for each bit passing by said magnetic head a read signal is produced having an amplitude proportional to the difference in angular orientation between said gap and the bit;
monitoring the amplitudes of said read signals; and
moving said guide member relative to said spindle and in a direction generally transverse to said axis to a position whereby the gap of said head is oriented so that said read signals have predetermined amplitudes which indicate that the orientation of said transducing gap is substantially parallel to a radial line of said spindle.

7. A method of aligning the magnetic head of a disk drive device as recited in claim 6 wherein said first and second angles are less than one degree.

8. A method of aligning the magnetic head of a disk drive device as recited in claim 6 wherein said first angle and said second angle are equal to 48 minutes, and further comprising a third angle of 24 minutes in the clockwise direction and a fourth angle of 24 minutes in the counterclockwise direction, the amplitude of said read signal including first, second, third and fourth portions corresponding to said angles and said predetermined amplitude is such that said third portion equals or exceeds said first portion or said fourth portion equals or exceeds said second portion and said third and fourth portions equal or exceed said first and second portions.

9. A method of positioning a lead screw in a disk drive having a rotatable spindle, a lead screw having a longitudinal axis and rotatably mounted to a motor, said lead screw carrying a carriage with a magnetic head affixed thereto, said magnetic head having a transducing gap that is capable of being disposed in a transducing relationship relative to bits of information on a disk and that is skewed at an angle relative to a radial line of said spindle, said method comprising:

providing a disk including a track having first, second, third and fourth bits of information, each said bit recorded at an acute angle relative to an intersecting radial line of said disk, said first bit being recorded at a first angle in the counterclockwise direction, said second bit being recorded at a second angle in the clockwise direction, said third bit being recorded at a third angle in the counterclockwise direction, and said fourth bit being recorded at a fourth angle in the clockwise direction, said first and fourth angles being substantially equal in magnitude, and said second and third angles being substantially equal in magnitude and substantially one-half that of said first angle;

mounting said disk upon the rotatable spindle;

disposing the magnetic head in a read position relative to the bits of said track as said disk is rotated;

rotating said disk such that as each said bit passes by said gap said magnetic head produces a read signal having an amplitude corresponding to the angular difference between the gap and the bit;

monitoring the amplitudes of said read signals; and moving said lead screw in a first direction transverse to said axis to a location such that said read signals have predetermined amplitudes indicating that said transducing gap is oriented substantially parallel to a radial line of said spindle.

10. A method of positioning a lead screw as recited in claim 9 wherein said first and second angles are less than one degree.

11. A method of positioning a lead screw as recited in claim 9 wherein said first and fourth angles are 48 minutes and said second and third angles are 24 minutes.

12. A method of positioning a lead screw as recited in claim 9 and prior to the step of moving, the step of moving said lead screw in a second direction toward said disk such that said transducing gap contacts the surface of said disk.

13. Magnetic disk drive apparatus having head alignment means, comprising:

a chassis;

a spindle and associated drive means therefor;

magnetic storage means for disposition upon said spindle and including a circular track having elongated bits of information magnetically recorded at a plurality of predetermined acute angles measured relative to intersecting radial lines of said spindle, said acute angles being in a range between a first angle in the counterclockwise direction relative to a radial line and a second angle in the clockwise direction relative to a radial line;

motor means;

lead screw means operatively coupled to and supported by said motor;

mounting means for mounting said motor means to said chassis in a position such that said lead screw means extends toward said spindle means, said mounting means being adjustable to permit said motor means to be selectively positioned such that said lead screw means may be selectively positioned laterally and angularly relative to a radial line of said spindle;

carriage means operatively coupled to said lead screw means and movable thereby between a position relatively remote from said spindle and a position proximate said spindle;

magnetic read/write head means having an elongated transducing gap, said head means being affixed to said carriage means so that the longitudinal dimension of said gap is oriented generally parallel to the axis of said lead screw means, said head means being operative to detect bits of information on said storage means and to develop read signals having amplitudes corresponding to the difference in angular orientations between the length of said gap and the longitudinal dimension of a bit passing thereby; and indicator means responsive to said read signals and operative to develop output signals which can be compared to a standard reference to indicate the degree of skew between said gap and a radial of said spindle so that said mounting means may be adjusted to change the position of said lead screw means and thus the path of travel of said carriage until the length of said gap is directed parallel to a radial of said spindle.

14. Magnetic disk drive apparatus as recited in claim 13 wherein said mounting means includes a mounting plate capable of being selectively positionable relative to said housing, first means for securing said motor means to said mounting plate, and second means for securing said mounting plate to said housing.

15. Magnetic disk drive apparatus as recited in claim 14 wherein said chassis includes a first locating surface for receiving said mounting plate, and a first member protruding from said chassis proximate said first locating surface, said first member having a second locating surface disposed normal to said first locating surface and serving to generally locate said mounting place on said first locating surface.

16. Magnetic disk drive apparatus as recited in claim 15 wherein said first locating surface includes a first central opening and three outer holes arranged in a generally triangular pattern; said mounting plate includes a second central opening, a slot and two apertures configured to correspond to the locations of said first opening and said three holes, respectively, said two apertures having larger diameters than those of said holes and said slot extending in a direction generally parallel to said second locating surface; and said second means includes first, second and third bolts, said first bolt extending through said slot and a hole, and said second and third bolts extending through an aperture and a hole when said mounting plate abuts said second locating surface, said mounting plate being movable in a second direction corresponding to that of said slot when said bolts are loosened, whereby said lead screw is capable of being moved such that said transducing gap contacts said disk, and said mounting plate being pivotable about said first bolt and movable in said first direction when said first bolt secures said mounting plate to said first locating surface and said second and third bolts are loosened, whereby said lead screw is capable of being pivoted in said first direction to a location where said transducing gap is perpendicular to a selected track on said disk.

* * * * *